(12) United States Patent
Torkelson et al.

(10) Patent No.: US 10,093,035 B1
(45) Date of Patent: Oct. 9, 2018

(54) COLORANT DISPERSION IN POLYMER MATERIALS USING SOLID-STATE SHEAR PULVERIZATION

(71) Applicant: Northwestern University, Evanston, IL (US)

(72) Inventors: John M. Torkelson, Skokie, IL (US); Philip Brunner, South Milwaukee, WI (US)

(73) Assignee: Northwestern University, Evanston, IL (US)

( * ) Notice: Subject to any disclaimer, the term of this patent is extended or adjusted under 35 U.S.C. 154(b) by 170 days.

(21) Appl. No.: 13/815,799

(22) Filed: Mar. 15, 2013

Related U.S. Application Data

(60) Provisional application No. 61/686,130, filed on Mar. 30, 2012.

(51) Int. Cl.
*B29B 7/82* (2006.01)
*B29C 47/78* (2006.01)
*C08L 23/12* (2006.01)
*B29C 47/80* (2006.01)
*B29B 7/02* (2006.01)
*B29B 7/72* (2006.01)
*B29B 17/04* (2006.01)
*B29C 47/82* (2006.01)
*B29C 47/84* (2006.01)

(52) U.S. Cl.
CPC ............... *B29B 7/823* (2013.01); *B29B 7/02* (2013.01); *B29B 7/72* (2013.01); *B29B 7/82* (2013.01); *B29C 47/805* (2013.01); *C08L 23/12* (2013.01); *B29B 17/0408* (2013.01); *B29B 2017/042* (2013.01); *B29B 2017/0416* (2013.01); *B29B 2017/0464* (2013.01); *B29C 47/788* (2013.01); *B29C 47/825* (2013.01); *B29C 47/845* (2013.01)

(58) Field of Classification Search
CPC . C08L 23/12; B29B 7/823; B29B 7/82; B29B 7/72; B29B 7/02; B29B 17/0408; B29B 2017/042; B29B 2017/0416; B29B 2017/0464; B29C 47/805; B29C 47/825; B29C 47/845; B29C 47/788
See application file for complete search history.

(56) References Cited

U.S. PATENT DOCUMENTS

| | | | | |
|---|---|---|---|---|
| 3,969,475 A | * | 7/1976 | Horiuchi et al. | 264/310 |
| 4,025,480 A | * | 5/1977 | Larsen | B29B 7/002 366/69 |
| 4,510,271 A | * | 4/1985 | Muhle | B29B 7/945 523/346 |
| 4,587,318 A | | 5/1986 | Inoue et al. | |
| 4,738,815 A | | 4/1988 | Friesen | |

(Continued)

OTHER PUBLICATIONS

Furgiuele, N. et al., "Novel Strategy for Polymer Blend Compatibilization: Solid-State Shear Pulverization", Macromolecules 2000, 33(2), 225-228.

(Continued)

*Primary Examiner* — Jeffrey Wollschlager
(74) *Attorney, Agent, or Firm* — Reinhart Boerner Van Deuren s.c.

(57) ABSTRACT

Methods for improved colorant dispersion in polymer materials using solid-state shear pulverization, as compared to mixing techniques of the prior art, to address concerns relating to colorant agglomeration, plating-out and the like.

28 Claims, 13 Drawing Sheets

(56) References Cited

U.S. PATENT DOCUMENTS

| | | | | |
|---|---|---|---|---|
| 4,906,428 | A * | 3/1990 | Kelly | C08J 3/203 264/122 |
| 4,944,970 | A * | 7/1990 | Stenger | A22C 13/0013 138/118.1 |
| 5,395,055 | A * | 3/1995 | Shutov et al. | 241/16 |
| 5,397,065 | A * | 3/1995 | Shutov et al. | 241/16 |
| 5,415,354 | A * | 5/1995 | Shutov et al. | 241/16 |
| 5,704,555 | A * | 1/1998 | Arastoopour | 241/16 |
| 5,743,471 | A * | 4/1998 | Ivanov | 241/16 |
| 5,769,335 | A * | 6/1998 | Shutov | 241/27 |
| 5,814,673 | A * | 9/1998 | Khait | 521/40 |
| 5,904,885 | A * | 5/1999 | Arastoopour et al. | 264/115 |
| 6,051,641 | A * | 4/2000 | Howard | C08K 3/22 524/430 |
| 6,180,685 | B1 | 1/2001 | Khait | |
| 6,316,547 | B1 * | 11/2001 | Varlet | C08J 3/226 525/191 |
| 6,428,733 | B1 * | 8/2002 | Zwart | B29B 9/16 241/15 |
| 6,479,003 | B1 * | 11/2002 | Furgiuele et al. | 264/176.1 |
| 6,494,390 | B1 * | 12/2002 | Khait et al. | 241/23 |
| 6,818,173 | B1 * | 11/2004 | Khait | 264/540 |
| 7,223,359 | B2 | 5/2007 | Torkelson et al. | |
| 7,229,581 | B2 * | 6/2007 | Kern | C08J 5/18 264/173.16 |
| 7,625,953 | B2 * | 12/2009 | Nising | B29C 44/3442 521/40 |
| 7,906,053 | B1 * | 3/2011 | Torkelson et al. | 264/211.21 |
| 8,597,557 | B1 * | 12/2013 | Torkelson et al. | 264/211.21 |
| 2002/0125352 | A1 * | 9/2002 | Ivanov et al. | 241/23 |
| 2003/0114555 | A1 * | 6/2003 | Dixon Steele | B29B 7/94 523/333 |
| 2005/0256266 | A1 * | 11/2005 | Lustiger | B29C 41/003 525/191 |
| 2006/0148916 | A1 * | 7/2006 | Loh et al. | 521/99 |
| 2010/0007047 | A1 * | 1/2010 | Lau | 264/239 |
| 2010/0167013 | A1 * | 7/2010 | Cruz et al. | 428/147 |
| 2010/0311882 | A1 * | 12/2010 | Eibeck et al. | 524/240 |
| 2012/0165187 | A1 * | 6/2012 | Topolkaraev et al. | 502/402 |
| 2013/0099160 | A1 * | 4/2013 | Topolkaraev et al. | 252/194 |
| 2013/0113135 | A1 * | 5/2013 | Wakabayashi et al. | 264/211.24 |

OTHER PUBLICATIONS

Furgiuele, N. et al., "Efficient Mixing of Polymer Blends of Extreme Viscosity Ratio: Elimination of Phase Inversion Via Solid-State Shear Pulverization", Polym. Eng. Sci. 2000, 40(6), 1447-1457.

Lebovitz, A. et al., "Stabilization of Dispersed Phase to Static Coarsening: Polymer Blend Compatibilization via Solid-State Shear Pulverization", Macromolecules 2002, 35, 8672-8675.

Tao, Y. et al., "Achievement of quasi-nanostructured polymer blends by solid-state shear pulverization and compatibilization by gradient copolymer addition", Polymer 2006, 47, 6773-6781.

Lebovitz, A. et al., "Sub-micron dispersed-phase particle size in polymer blends: overcoming the Taylor limit via solid-state shear pulverization", Polymer 2003, 44, 199-206.

* cited by examiner

Superior Mixing with SSSP Processing

Mechanical Properties

| Sample | Processing History | Young's Modulus E (MPa) | Yield Strength $\sigma_y$ (MPa) | Elongation-at-Break $\varepsilon_B$ (%) |
|---|---|---|---|---|
| PP, Pellet | As-received | 720 +/- 20 | 26.4 +/- 1.1 | 810 +/- 40 |
| PP/Waste Green (100:1 Let Down) | MM only | 710 +/- 10 | 25.3 +/- 0.3 | 710 +/- 180 |
| PP/Waste Green (100:1 Let Down) | SSSP/MM | 740 +/- 10 | 26.1 +/- 0.1 | 800 +/- 20 |
| PP/Dark Purple (96/4 wt%) | MM only | 720 +/- 20 | 26.2 +/- 0.2 | 730 +/- 90 |
| PP/Dark Purple (96/4 wt%) | SSSP/MM | 730 +/- 20 | 26.7 +/- 0.4 | 820 +/- 50 |

- Pulverized samples show much less variability and better mechanical performance

Figure 8

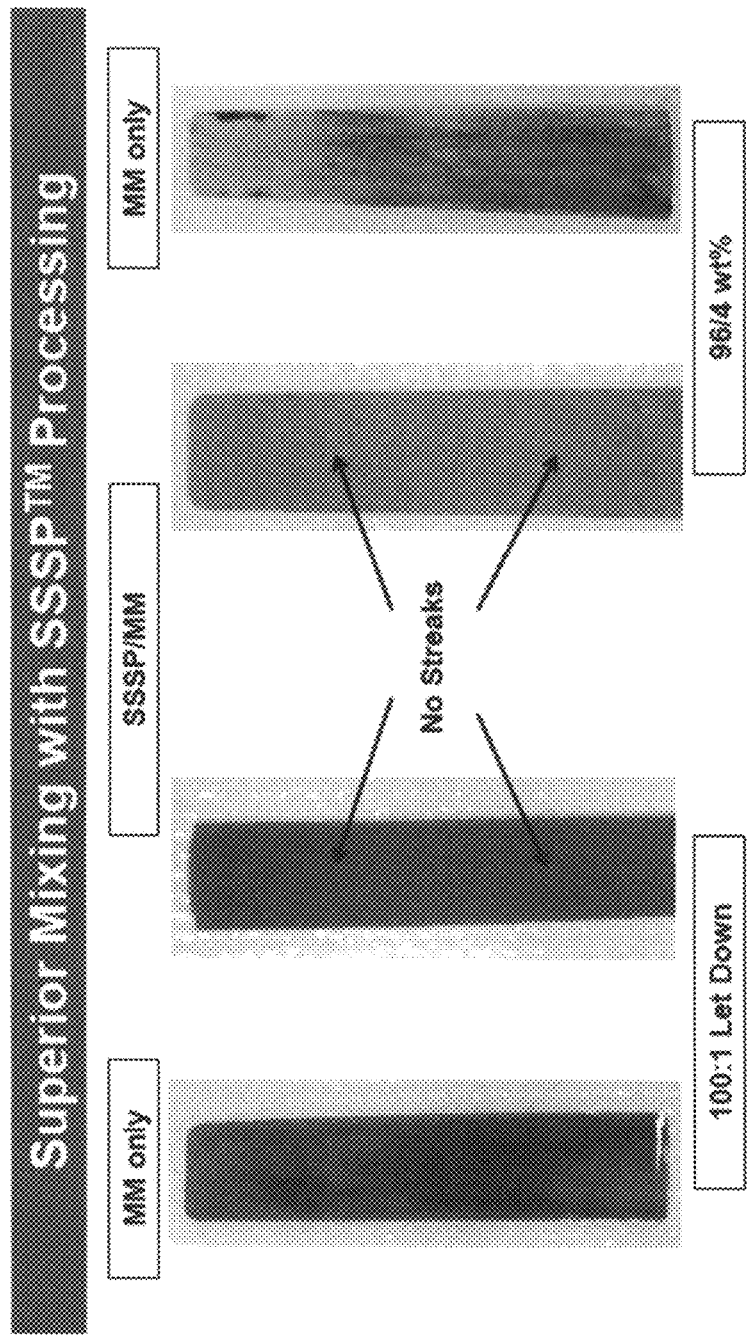

COLORANT DISPERSION IN POLYMER MATERIALS USING SOLID-STATE SHEAR PULVERIZATION

This application claims priority benefit from application Ser. No. 61/686,130 filed Mar. 30, 2012, the entirety of which is incorporated herein by reference.

This invention was made with government support under DMR-0520513 awarded by the National Science Foundation. The government has certain rights in the invention.

BACKGROUND OF THE INVENTION

Typically, manufacture of colored plastic products involves feeding a mixture of colorant material (e.g., 65/35 wt % colorant/polymer) and neat polymer resin to a single or double screw extruder, mixing in the melt state and molding the melt to a final product form. However, several issues are often encountered with such a process and relate to the initial colorant and polymer materials utilized. For instance, phase separation of the colorant and polymer can lead to a color shift over time in the final product. Such a phenomenon is a direct result of viscosity differential between the two materials. Further, with some colorants or pigments, a "swirling" pattern in the molded product can lead to color distortion. Identification of such issues often requires apparatus shut-down and thorough cleaning, both of which lead to lower production rates and increased cost.

Other processing techniques present particular colorant-related issues. For instance, consider rotational molding, an approach used to produce hollow containers and other products of larger size and complicated structure which cannot be readily molded by other conventional molding processes, such as injection molding and sheet thermoforming. Products produced by rotational molding typically include, for example, gasoline tanks, casks, storage tanks and toys.

In rotational molding, a plastic resin is melted and fused in a closed mold, without application of external pressure. Typically, a resin-charged mold is moved into an oven apparatus and slowly rotated about two axes. As heat penetrates the mold, the resin adheres to the inner surface until completely fused. The mold is then cooled by air and/or water, while still rotating, to gradually lower the internal temperature. Upon removal of the finished part, the mold can be recharged for another process cycle. A variety of polymeric resins can be utilized, including but not limited to polyethylenes, nylons, fluoropolymers, polycarbonates, polypropylenes, polyurethanes and the like. An example of a prior art rotational molding apparatus is found in Friesen U.S. Pat. No. 4,738,815. An example of a prior art polymeric resin powder for use in rotational molding may be found in Inoue et al. U.S. Pat. No. 4,587,318.

As discussed in the Inoue et al. '318 patent, polymeric resin powders used in rotational molding can be mixed with colorants/pigments to impart desired color to the molded product. Such colorants can be added to the polymeric resin powders in the form of dry powders or solids. Unfortunately, these dry materials often present handling and mixing problems. Specifically, dry pigment powders may form undesirable dust or mix unevenly with the polymeric resin powders resulting in non-uniform color distribution in the molded product. Further, colorant additives can agglomerate, leading to poor mechanical performance, and/or "plate-out" the polymer matrix and deposit on an interior mold surface.

In light of such difficulties, various other mixing techniques have been tried. In turbo-blending, for instance, powdered pigments are bonded to the surface of plastic resin powder by rotating both together at high speeds at an elevated temperature. While dispersion is enhanced, many of the same issues remain as with dry mixing (e.g., agglomeration, plating-out and poor mechanical performance, etc.). Such problems can be addressed by compounding a pigment into the polymer resin using extrusion followed by solid-state grinding. While uniform color dispersion can be achieved, high processing temperatures can lead to pigment degradation—especially so with organic colorants. Further, multiple processing steps contribute toward higher operating costs.

As a result, there remains an on-going search in the art—with respect to both general melt processing and, more specifically, rotational molding—for one or more methods to incorporate colorant additives into polymeric resin materials to better utilize the benefits and advantages available from such technologies.

SUMMARY OF INVENTION

In light of the foregoing, it is an object of the present invention to provide one or more methods relating to the use of solid-state shear pulverization to incorporate colorant additives into polymeric materials. It would be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide one or more methods to effectively disperse a colorant within a polymer resin, so as to preclude or minimize subsequent phase separation or color distortion within a product part.

It can be another object of the present invention to use solid-state shear puNerization to reduce effective colorant concentration, without compromising one or more color characteristics of a product part.

It can also be an object of the present invention, alone or in conjunction with one or more of the preceding objectives, to provide a method for mixing a colorant additive with a polymeric resin material for use with a rotational molding process.

Other objects, features, benefits and advantages of the present invention will be apparent from this summary and the following descriptions of certain embodiments, and will be readily apparent to those skilled in the art having knowledge of various plastic production techniques. Such objects, features, benefits and advantages will be apparent from the above as taken into conjunction with the accompanying examples, data and all reasonable inferences to be drawn therefrom; alone or with consideration of the references incorporated herein:

In part, the present invention can be directed to a method of preparing a colorant-polymer mixture. Such a method can comprise providing a colorant component and a polymer component mixture; and applying a mechanical energy to such a mixture through solid-state shear pulverization in the presence of an element of cooling at least partially sufficient to maintain such a mixture in a solid state, such pulverization as can be at least partially sufficient to disperse such a colorant component within such a polymeric resin component.

In certain embodiments, such a polymer component can be selected from virgin and recycled (i.e., post-consumer)

polymers of the sort discussed below, illustrated herein and as would otherwise be understood by those skilled in the art made aware of this invention. In certain such embodiments, such a polymer component can be a polyolefin such as a polypropylene. Regardless, in certain embodiments and irrespective of polymer identity, such a colorant component can comprise one or more organic pigments, inorganic pigments and dyes or, as an alternative, be provided by a post-consumer material. Without limitation or identity, such a colorant component can comprise about 0.1 wt % to about 60.0 wt % of such a polymer-colorant mixture. A polymer-colorant mixture can also comprise one or more additives of the sort discussed below, illustrated herein or as would otherwise be understood by those skilled in the art and made aware of this invention. Regardless of the presence of any such additive, after solid-state shear pulverization, such a polymer-colorant mixture can be melt-processed then, optionally, incorporated into an article of manufacture.

In part, the present invention can also be directed to a method of preparing a colorant-polymer dispersion. Such a method can comprise providing a mixture of a colorant component and a polymer component; applying a mechanical energy thereto through solid-state shear pulverization in the presence of an element of cooling at least partially sufficient to maintain such a mixture in a solid state; and melt-processing such a colorant-polymer mixture to provide a colored molded part without at least one of phase separation and reduced colorant swirling. With regard to any embodiment of such a method, mixture components, amounts thereof, optional additive(s) and further processing step(s) can be as discussed above or illustrated elsewhere herein.

In part, the present invention can be directed to a method of using solid-state shear pulverization to reduce colorant content of a molded product. Such a method can comprise providing a colorant component and polymer component mixture; introducing such a mixture into a solid-state shear pulverization apparatus, such an apparatus as can comprise a cooling component at least partially sufficient to maintain mixture solid state; discharging such a shear-pulverized mixture from the apparatus; and melt-processing such a mixture to provide a molded product with reduced colorant component concentration, such reduction as can be compared to the colorant concentration and color characteristic of a melt-processed product prepared without use of a solid-state shear pulverization apparatus. With regard to any embodiment of such a method, mixture components, amounts thereof, optional addtive(s) and further processing step(s) can be as discussed above or illustrated elsewhere herein.

In part, the present invention can also be directed to a method of rotationally molding a colored polymeric product. Such a method can comprise providing a colorant component and a polymeric resin component mixture; applying a mechanical energy thereto through solid-state shear pulverization in the presence of an element of cooling at least partially sufficient to maintain such a mixture in a solid state, such pulverization sufficient to provide a powdered mixture; and introducing such a shear-pulverized powder mixture into a rotational molding apparatus to produce a rotationally-molded product, such a colorant as can be embedded in a polymer and such a product substantially absent observed colorant plate-out. With regard to any embodiment of such a method, mixture components, amounts thereof, optional additive(s) and further processing step(s) can be as discussed above or illustrated elsewhere herein.

BRIEF DESCRIPTION OF THE DRAWINGS

FIG. 8. Tabulated data showing improved polymer mechanical properties.

FIGS. 9A-C. Digital images demonstrating colorant embedded in polymer matrix and dispersed in powdered output, and melt-processed product parts with no apparent plate-out effect.

DETAILED DESCRIPTION OF CERTAIN EMBODIMENTS

As illustrated through certain non-limiting embodiments, the present invention involves intimately mixing and dispersing colorant in a polymeric material via solid-state shear pulverization (SSSP), which can then be followed by melt processing (MP). As demonstrated, below, a two-step SSSP/MP procedure can achieve a similar color to a part made only by melt-processing by using approximately 10-~15% and up to about 25% less colorant. With colorant costs from $10/lb to $100/lb, any reduction in the amount of colorant needed to make a part but still maintain the desired color can lead to significant savings. This invention represents the first time SSSP has been utilized to effectively disperse colorant pellets in polymeric materials, and the outcomes obtained demonstrate the capability to overcome major issues in the industry.

In conjunction with the following examples, a continuous, industrially scalable SSSP process was used to disperse colorant materials in a polymer matrix. A commercially-available modified twin-screw extruder from Berstroff can be utilized. A difference in the SSSP apparatus used herein and conventional twin-screw extruders is that the SSSP apparatus is maintained at a temperature below the glass and/or melt transition temperature of the polymer through a circulating cooling system (e.g., recirculating ethylene glycol and water; 60/40 w/w) set at ~20° F. (~−7° C.) around the pulverizer barrels. Such a process temperature allows for repeated fragmentation and fusion steps in the solid state without the limitations of thermodynamics, viscosity, and degradation often encountered in melt processing of polymers.

Figure 1:
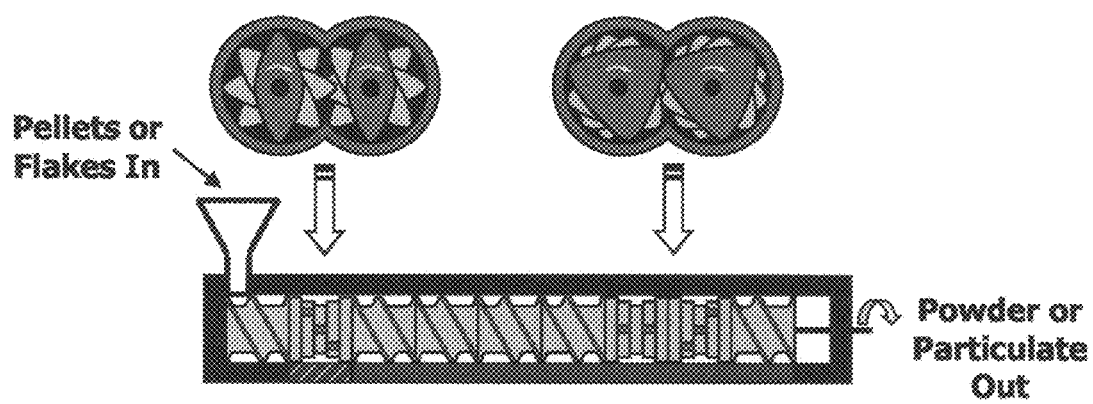
FIG. 1. A schematic illustration of a solid-state shear pulverization (SSSP) apparatus, for use in conjunction with the present invention.

An SSSP apparatus (FIG. 1) consists of three zones: mixing, conveying, and pulverization. Throughout these zones, the screws are of a different combination of conveying, mixing, and shearing elements. A difference between the SSSP apparatus used herein and conventional extruders is the use of tri-lobe rather than bi-lobe screw elements in the pulverization zone. These unique tri-lobe elements allow for an extremely high level of shear stress to be imparted on the polymer. The level of the applied shear stress can be tuned by altering the type of screw applied. For example, using reverse shearing elements results in making the screw "harsher" and increases the residence time in the apparatus; using forward shearing elements results in making the screw less "harsh" and reduces the residence time. The material enters as pellets but exits the pulverizer in the solid state as powder, flakes, or particulate.

Intimate mixing between colorant(s) and polymer material occurs during the pulverization process, to provide a uniform powdery output that can then be further melt-processed. By achieving a uniform output, the material can be melt-processed without any noticeable shift in color—thereby, overcoming one of the major technical challenges often encountered in industry. Further, methods of this invention can reduce or eliminate deleterious "swirling" of color that by comparison to and what may occur in samples subjected to only melt-processing. Comparative testing, below, shows the "swirling" effect from a product part that was just melt-processed and the elimination of this phenomenon in a product part that was processed with the two-step SSSP/MP procedure, respectively. To date, no other technology is known to provide such results.

More specifically, relating to use of this invention in conjunction with rotational molding, solid-state shear pulverization can overcome dispersion issues by effectively breaking up pigment agglomerates. Further, as applied to organic colorants, processing in the solid state significantly reduces thermal degradation. Economics are also enhanced by elimination of multiple processing steps—as compared, for instance, to compounding—so much so that small batch production can be economically feasible. More generally, solid-state shear pulverization, whether used with rotational molding or other melt processing techniques, can be continuous, is industrially scalable and permits high-throughput processing. Additional advantages relate to low maintenance, ease of cleaning, simple operation, and the ability to transition from one job/color to another with minimal loss of production time.

As would be understood by those skilled in the art, various polymers can be used in conjunction with this invention, including but not limited to polyesters, polyolefins (e.g., high- and low-density polyethylene), polyamides, epoxies, polycarbonates, polyacrylates, polyvinyls, polyethers, polyacrylonitriles, polyacetals, polysiloxanes, polyetherketones, elastomers, polyimides, polyurethanes, polystyrenes, copolymers thereof, combinations of such polymers, combinations of such copolymers and combinations of such polymers and copolymers, such combinations as can be utilized without compatibilizer additives of the prior art. More specifically, with regard to certain embodiments of this invention comprising rotational molding, polymers and copolymers of olefins, such as polypropylene and ethylene-vinyl acetate copolymer, acrylonitrile-butadiene-styrene copolymer and polyamides, are among others known in the art. Regardless, one or more post-consumer plastic materials, suitably flaked or processed, can be utilized as a polymer component or an adjuvant thereto, and/or as a colorant component or adjuvant thereto. For example, feedstock from scrap auto tail lamp covers, containing polycarbonate or poly(methyl methacrylate) can be shear-pulverized to provide a uniform powder for use with standard melt-processing or rotational molding. Likewise, colored polypropylene bottle caps (e.g., blue-green or orange) can be utilized in a similar fashion.

Various other colorants may be utilized in conjunction with the present invention—whether comprising a general melt-processing technique or, more specifically, rotational molding. The term "colorant" when used herein denotes, for instance, any conventional inorganic or organic pigment, organic dyestuff or carbon black, such a material as can be used in a amounts up to about 1 wt %, about 3 wt %, about 5 wt %, about 10 wt %, or up to about 60.0 wt % or more of the total colorant/polymeric resin mixture, and/or in amounts useful to achieve desired color characteristic. Such a colorant can be present at such or higher concentration in conjunction with a polymeric resin (e.g., as colorant pellets) in a master batch and "let-down" through subsequent processing, as would be understood by those skilled in the art. Those skilled in the art also will be aware of suitable inorganic pigments, organic pigments and dyestuffs useful as colorants. Such materials are described, for example, in Kirk-Othmer Encyclopedia of Chemical Technology, Third Edition, Vol. 6, pages 597-617, which is incorporated by reference herein; examples include, but are not limited to:

(1) inorganic types such as titanium dioxide, carbon black, iron oxide, zinc chromate, cadmium sulfides, chromium oxides, sodium aluminum silicate complexes, such as ultramarine pigments, metal flakes and the like; and (2) organic types such as azo and diazo pigments, phthalocyanines, quinacridone pigments, perylene pigments, isoindolinone, anthraquinones, thioindigo, and the like. Various conventional additives or mixtures thereof may also be included in the colorant polymeric mixture such as, for example, lubricants, antistats, impact modifiers, flame retardants, antimicrobials, anti-oxidants, light stabilizers, filler/reinforcing materials (e.g., CaCO), heat stabilizers, release agents, rheological control agents such as clay, etc. Such colorants and/or additives can be incorporated in amounts known by those skilled in the art to achieve desired effect.

EXAMPLES OF THE INVENTION

The following non-limiting examples and data illustrate various aspects and features relating to the methods of this invention, including the preparation of uniform dispersions of colorant and polymer materials, as can be further utilized in conjunction with various melt-processing or rotational molding operations. In comparison with the prior art, the present methods provide results and data which are surprising, unexpected and contrary thereto. While the utility of this invention is illustrated through the use of several colorant and polymer materials, it will be understood by those skilled in the art that comparable results are obtainable with various other colorants, polymers and component mixtures, as are commensurate with the scope of this invention.

Example 1

The SSSP apparatus utilized was a modified twin-screw extruder (model ZE-25P) from Berstoff (25 mm screw diameter; length/diameter=26.5). As mentioned above, major differences between the SSSP apparatus employed in this study and a conventional twin-screw melt extruder involve the ability to cool the barrel below room temperature (a −7° C. cooling medium is used to cool the barrels) and the use of tri-lobe rather than bi-lobe screw elements along a portion of the pulverizer screw. For these experiments, blends were processed utilizing a screw design involving 2-7 forward bi-lobe elements in the "mixing zone" and 6-7 tri-lobe elements in the pulverization zone (e.g., four were forward, two neutral, and one reverse) with variable barrel (23 mm vs. 25 mm diameter) for controlling harshness. A feed rate of ~0.1-~4 lbs/hr were employed depending on material choice and SSSP parameters. (Commercial-sized pulverizers can provide a throughput of 1000 lbs/hr.) Details regarding SSSP processes and equipment (e.g., component construction, screw elements, transport elements, kneading or shearing elements, and spacer elements and/or the sequence or design thereof selected or varied as required to accommodate a polymer starting material, pulverization parameters and/or a resulting pulverized polymer product) are known to those skilled in the art made aware of this invention. (See, e.g., Furgiuele, N.; Lebovitz, A. H.; Khait, K.; Torkelson, J. M. *Macromolecules* 2000, 33, 225-228; Furgiuele, N.; Lebovitz, A. H.; Khait, K.; Torkelson, J. M. *Polym Eng. Sci* 2000, 40, 1447-1457; Lebovitz, A. H.; Khait, K.; Torkelson, J. M. *Macromolecules* 2002, 35, 8672-8675; Kasimatis, K. G.; Torkelson, J. M. *PMSE Prepr* 2005, 92, 255-256; Tao, Y.; Kim, J.; Torkelson, J. M. *Polymer* 2006, 47, 6773-6781; Walker, A. M.; Tao, Y.; Torkelson, J. M. *Polymer* 2001, 48, 1066-1074; Lebovitz, A. H.; Khait, K.; Torkelson, J. M. *Polymer* 2003 44, 199-206; and U.S. Pat. Nos. 5,814,673; 6,180,685; and 7,223,359—each of which is incorporated herein by reference in its entirety.)

More specifically, with respect to the following embodiments, a harsh screw design was employed: two forward, three neutral and two reverse kneading elements in the mixing zone, in combination with three forward, two neutral and two reverse elements in the pulverization zone. For purposes of demonstration, throughput was maintained between 100-125 g/hr for all samples.

Example 2

Figure 2:
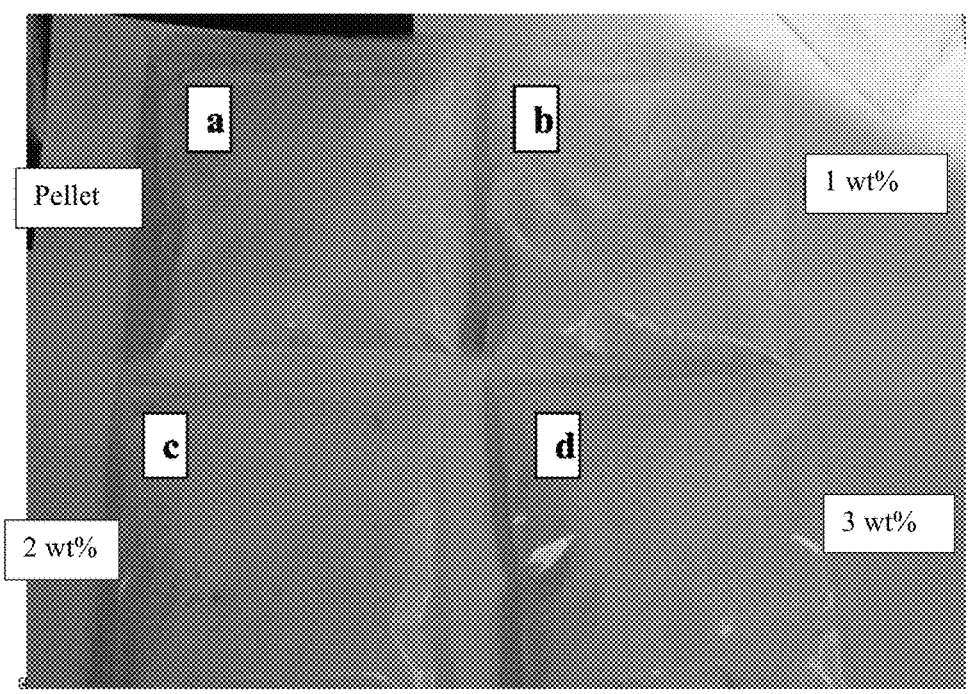
FIG. 2. Digital images of output of green colorant added to polypropylene via SSSP: A) neat PP, B) 99/1 wt % PP/colorant, C) 98/2 wt % PP/colorant, and D) 97/3 wt % PP/colorant.
Figure 3:
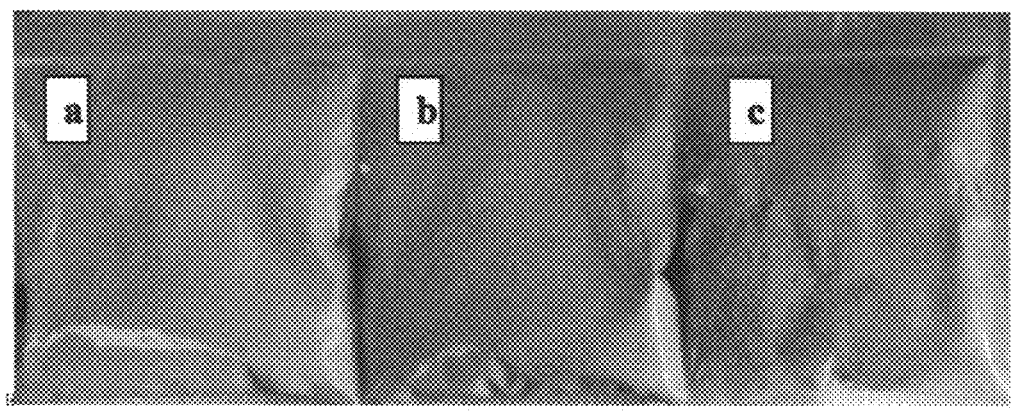
FIG. 3. Digital images of output of purple colorant added to polypropylene via SSSP: A) 99/1 wt % PP/colorant, B) 98/2 wt % PP/colorant, and C) 97/3 wt % PP/colorant.
Figure 4:
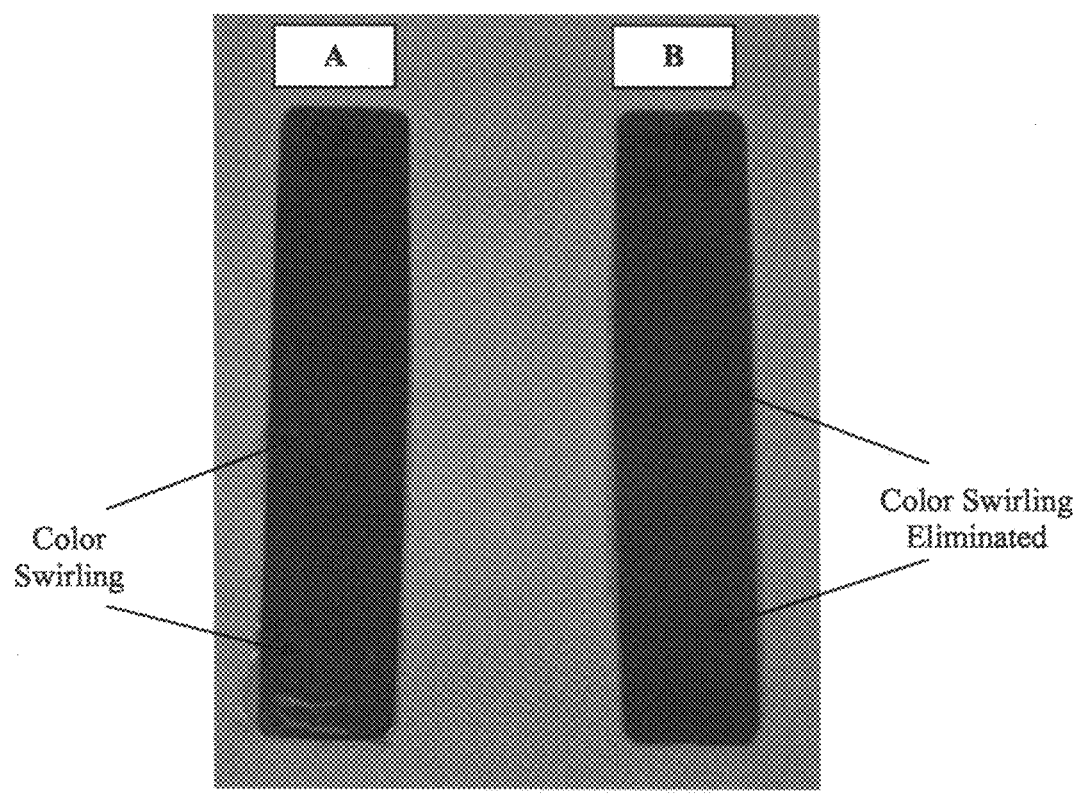
FIG. 4. Digital images showing comparative test results: "Swirling" occurs in samples processed A) only by MP but is eliminated if processed with B) a two-step SSSP/MP procedure, in accordance with this invention.

Three different colorant pellets (green, bluish-green, and purple) were blended with polypropylene (PP) via SSSP followed by melt processing. FIGS. 2 and 3 show the powdery output that resulted from SSSP processing. Color shifting is a major problem often encountered in industry. As seen therein, a uniformly colored output was achieved, which eliminated the color shift that occurs over time with sample parts made by melt processing, alone. FIG. 4 shows two sample parts made from (A) melt processing, alone, and (B) from a two-step SSSP/MP procedure. As shown, the present invention can eliminate "swirling" that may occur with some colorants in product parts made only by melt processing.

Example 3

Figure 5:
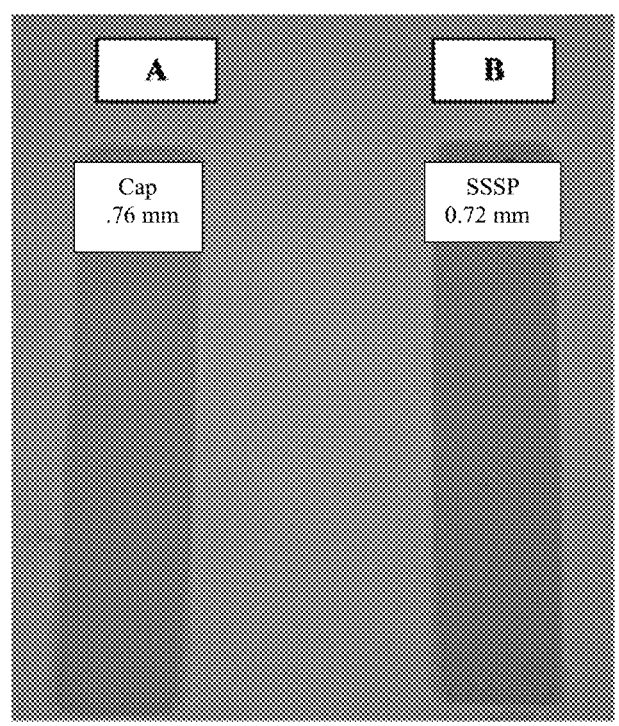
FIG. 5. Digital images comparing green colored parts made by A) melt processing, alone, and B) a two-step SSSP/MP procedure, in accordance with this invention.
Figure 6:
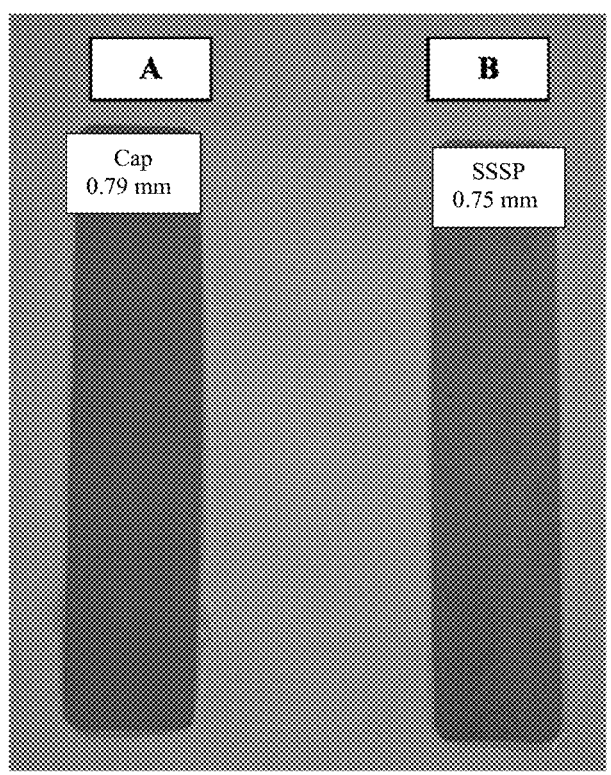
FIG. 6. Digital images comparing bluish-green colored parts made by A) melt processing, alone, and B) a two-step SSSP/MP procedure, in accordance with this invention.
Figure 7:
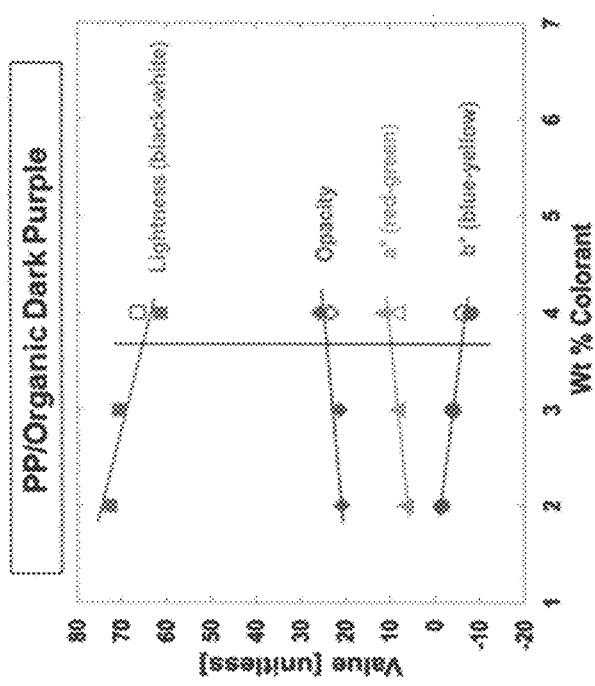
FIG. 7. Graphic data showing, in accordance with this invention, colorant reduction without substantial change in color characteristics.

The cost of colorant resin is significantly higher than the cost of neat polymer resin, as much as ten to one hundred times more expensive; therefore, any reduction in the use of colorants needed to make a plastic part can lead to significant savings. As demonstrated herein, a two-step SSSP/MP procedure, in accordance with this invention, can use approximately 25 wt % less colorant as compared to melt-processing, alone, without compromising color characteristic(s). FIGS. 5A and 5B show, respectively, green-colored parts made by melt-processing, alone, and a two-step SSSP/MP procedure. FIGS. 6A and 6B show, respectively, bluish-green colored parts made by melt-processing, alone, and a two-step SSSP/MP procedure. From FIGS. 5 and 6, it can be seen that parts made from a two-step SSSP/MP procedure, using approximately 25 wt % less colorant, have color nearly identical to those made only by melt processing. See, also, FIG. 7 for a graphic summary of comparative test results.

Example 4

Representative melt-mixed (MM) shear—pulverized colorant/polymer mixtures, in accordance with this invention, have been characterized with respect to various standard mechanical properties. With reference to the tabulated data of FIG. 8, such materials are observed to exhibit improved mechanical properties, as compared to as-received components and mixtures which were melt-mixed, alone, without solid-state shear pulverization.

Example 5

From a commercial perspective, the present invention can be utilized for the addition of colorant to polymeric materials in conjunction with processes including but not limited to injection molding, blow molding, compression molding, fiber spinning, and other melt-processing techniques understood in the art.

Example 6

Figure 9A:
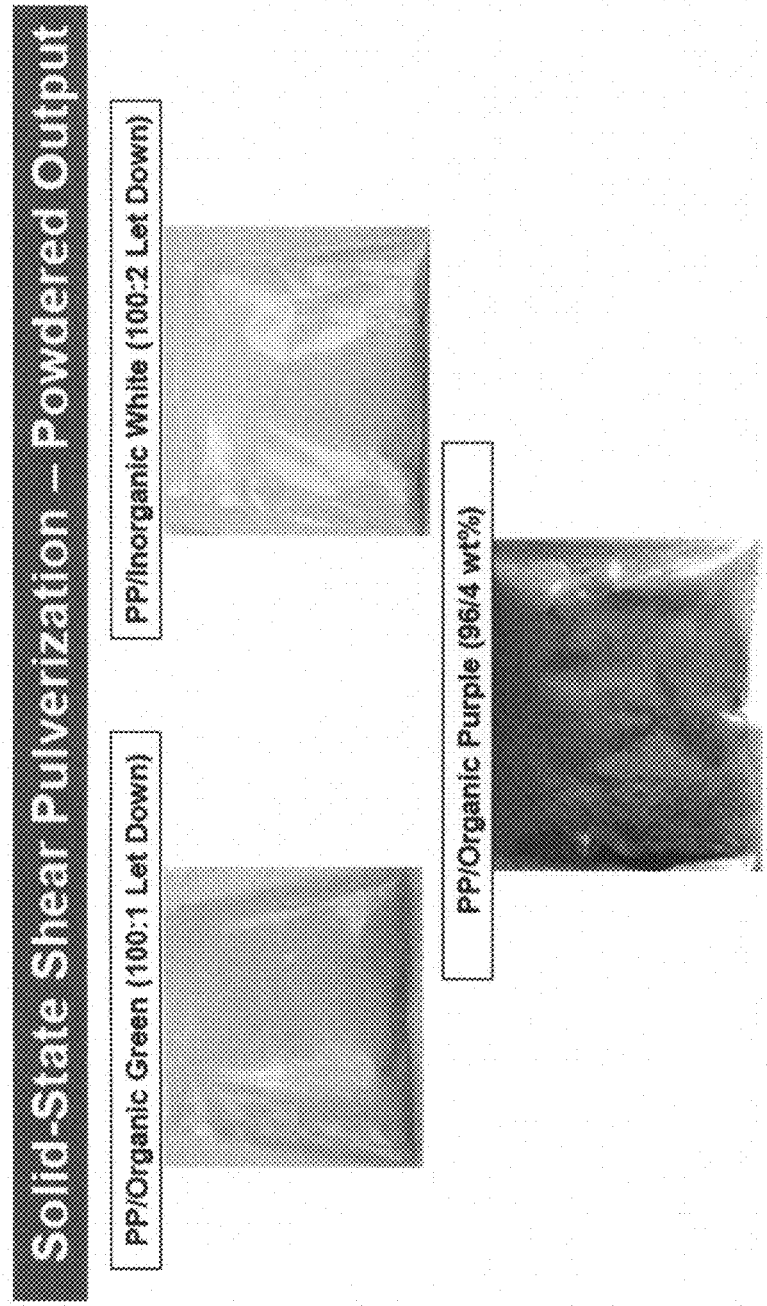
Figure 9B:
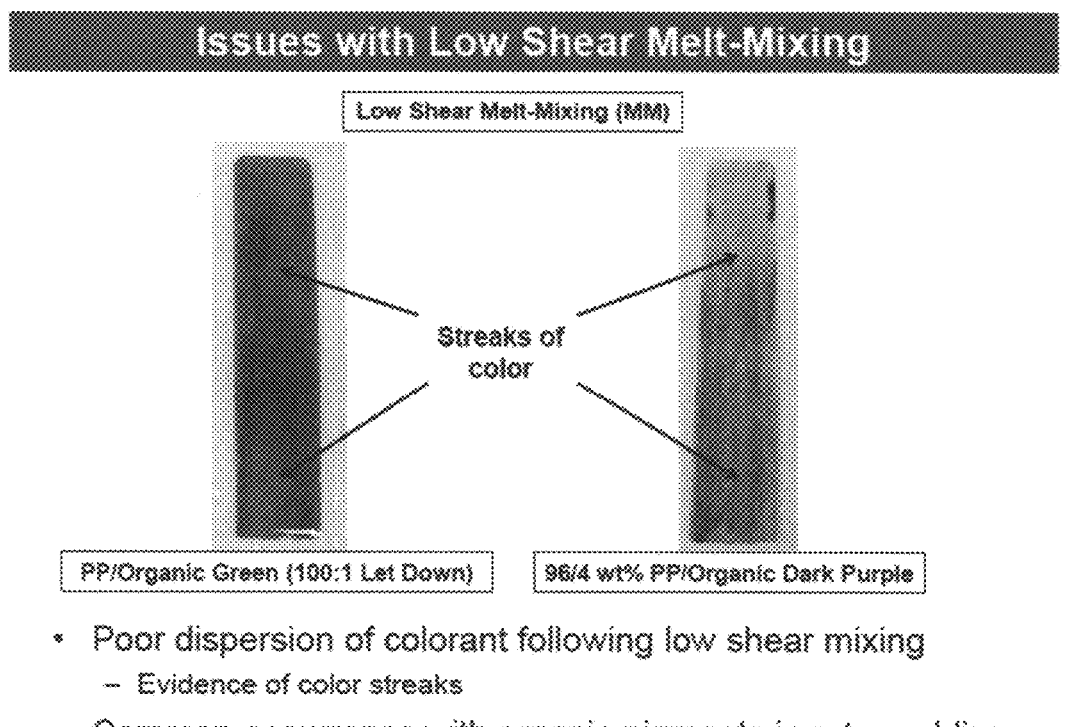

Uniform colorant dispersion in a polymer (e.g., polypropylene) matrix, as available through the methods of this invention are observed through the digital images of FIGS. 9A-C. Whether in a final concentration or prepared as a master batch at high colorant concentration to the let down by subsequent processing, there is no pigment rub off observed with the powdered output. Subsequent melt-mixing provides a product part without colorant streaking, as compared to melt-mixing without solid-state shear pulverization.

Example 7

Figure 10:
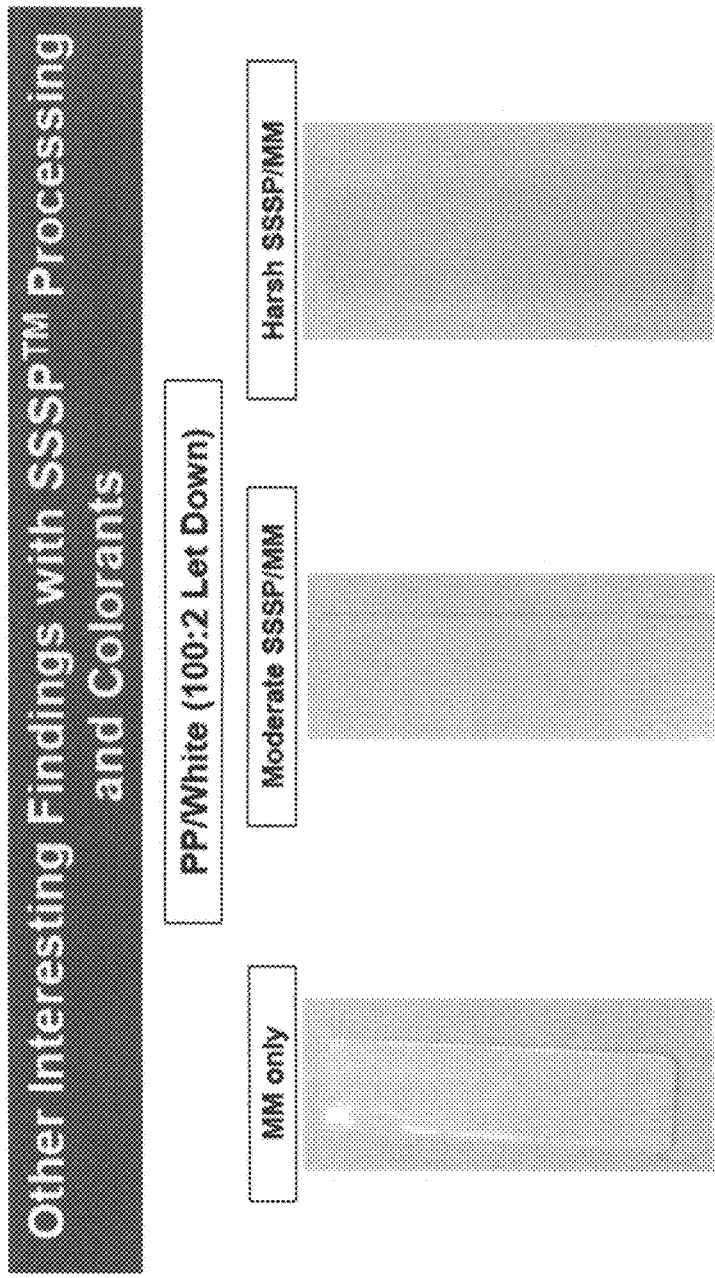
FIG. 10. Digital images illustrating tunable final product part color through variation of SSSP screw design.
Figure 11:
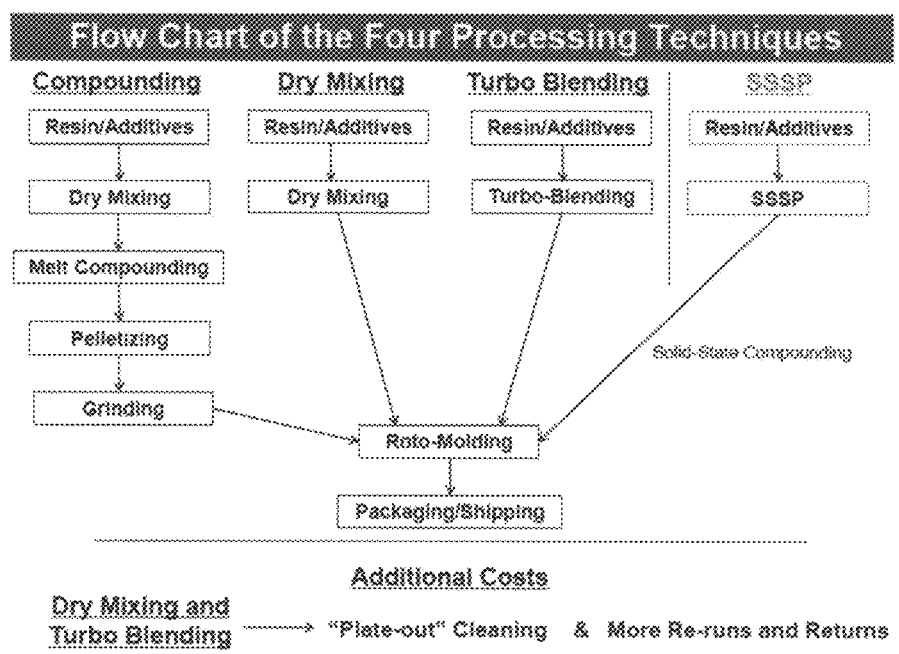
FIG. 11. Schematic flowchart illustrating comparative advantage of the present methodologies over processing techniques of the prior art.

It has been observed that, using the same colorant formulation, final color of a product part can be tuned through solid-state shear pulverization by varying screw design. Reference is made to FIG. 10, where digital images illustrate change in color with harsher screw design.

We claim:
1. A method of preparing a polymer and colorant mixture, said method comprising:
   providing a polymer component and a colorant pellet mixture, providing said polymer component and colorant pellet are not post-consumer or post-industrial plastic; and
   applying a mechanical energy to said mixture through solid-state shear pulverization in the presence of cooling at least partially sufficient to maintain said polymer component in a solid state during said pulverization, said pulverization at least partially sufficient to disperse said colorant pellet within said polymer component,
said colorant pellet prepared by providing a polymeric resin and a colorant component and applying a mechanical energy to said polymeric resin and said colorant component through solid-state shear pulverization in the presence of cooling at least partially sufficient to maintain said polymeric resin in a solid state during said pulverization, said pulverization at least partially sufficient to disperse said colorant component within said polymeric resin.

2. The method of claim 1 wherein said polymer component is selected from virgin polyesters, polyolefins, polyamides, epoxies, polymides, polyurethanes, polystyrenes, polycarbonates, polyacrylates, polyvinyls, polyethers, polyacrylonitriles, polyacetals, polysiloxanes, polyetherketones, elastomers and copolymers thereof, combinations of said polymers, combinations of said copolymers and combinations of said polymers and copolymers.

3. The method of claim 2 wherein said polymer component comprises a polyolefin.

4. The method of claim 1 wherein said colorant component comprises about 0.1 wt. % to about 60.0 wt. % of said mixture.

5. The method of claim 1 comprising melt-processing following solid-state shear pulverization.

6. The method of claim 1 wherein said colorant component is selected from organic pigments, inorganic pigments and dyes, and combinations thereof.

7. The method of claim 6 wherein said polymer component and colorant pellet mixture comprises an additive selected from lubricants, antistats, impact modifiers, flame retardants, antimicrobials, anti-oxidants, light stabilizers, filler/reinforcing materials, heat stabilizers, release agents, rheological control agents and combinations thereof.

8. The method of claim 1 wherein said mixture is incorporated into an article of manufacture.

9. A method preparing a uniform colorant-polymer dispersion, said method comprising:
providing a polymer component and colorant pellet mixture, providing said polymer component and colorant pellet are not post-consumer or post-industrial plastic materials;
applying a mechanical energy to said mixture through solid-state shear pulverization in the presence of cooling at least partially sufficient to maintain said polymer in a solid state during said pulverization; and
melt-processing said colorant pellet-polymer component mixture, to provide a colored molded part without phase separation and with at least reduced colorant swirling,
said colorant pellet prepared by providing a polymeric resin and a colorant component and applying a mechanical energy to said polymeric resin and said colorant component through solid-state shear pulverization in the presence of cooling at least partially sufficient to maintain said polymeric resin in a solid state during said pulverization, said pulverization at least partially sufficient to disperse said colorant component within said polymeric resin.

10. The method of claim 9 wherein said polymer component is selected from virgin polyesters, polyolefins, polyamides, epoxies, polymides, polyurethanes, polystyrenes, polycarbonates, polyacrylates, polyvinyls, polyethers, polyacrylonitriles, polyacetals, polysiloxanes, polyetherketones, elastomers and copolymers thereof, combinations of said polymers, combinations of said copolymers and combinations of said polymers and copolymers.

11. The method of claim 9 wherein said colorant component comprises about 0.1 wt. % to about 60.0 wt. % of said mixture.

12. The method of claim 9 wherein said colorant component is selected from organic pigments, inorganic pigments and dyes, and combinations thereof.

13. The method of claim 12 wherein said polymer component and colorant pellet mixture comprises an additive selected from lubricants, antistats, impact modifiers, flame retardants, antimicrobials, anti-oxidants, light stabilizers, filler/reinforcing materials, heat stabilizers, release agents, rheological control agents and combinations thereof.

14. The method of claim 9 wherein said molded part is incorporated into an article of manufacture.

15. A method of rotationally molding a colored polymeric product, said method comprising:
providing a polymer component and a colorant pellet mixture, providing said polymer component and colorant pellet are not post-consumer or post-industrial plastic materials;
applying a mechanical energy to said mixture through solid-state shear pulverization in the presence of cooling at least partially sufficient to maintain said polymer component in a solid-state during said pulverization, said pulverization sufficient to provide a powdered mixture; and
introducing said shear-pulverized powder mixture into a rotational molding apparatus, to produce a rotationally-molded product, said colorant pellet embedded in said polymer component and said product absent observed colorant plate-out,
said colorant pellet prepared by providing a polymeric resin and a colorant component and applying a mechanical energy to said polymeric resin and said colorant component through solid-state shear pulverization in the presence of cooling at least partially sufficient to maintain said polymeric resin in a solid state during said pulverization, said pulverization at least partially sufficient to disperse said colorant component within said polymeric resin.

16. The method of claim 15 wherein said polymer component is selected from virgin polyesters, polyolefins, polyamides, epoxies, polymides, polyurethanes, polystyrenes, polycarbonates, polyacrylates, polyvinyls, polyethers, polyacrylonitriles, polyacetals, polysiloxanes, polyetherketones, elastomers and copolymers thereof, combinations of said polymers, combinations of said copolymers and combinations of said polymers and copolymers.

17. The method of claim 16 wherein said polymer component comprises a polyolefin.

18. The method of claim 15 wherein said colorant component comprises about 0.1 wt. % to about 60.0 wt. % of said mixture.

19. The method of claim 15 wherein said colorant component is selected from organic pigments, inorganic pigments and dyes, and combinations thereof.

20. The method of claim 19 wherein said polymer component and colorant mixture pellet comprises an additive selected from lubricants, antistats, impact modifiers, flame retardants, antimicrobials, anti-oxidants, light stabilizers, filler/reinforcing materials, heat stabilizers, release agents, rheological control agents and combinations thereof.

21. The method of claim 15 wherein said rotationally-molded product is incorporated into an article of manufacture.

22. A method of preparing a polymer and colorant mixture, said method comprising:
providing a polymer component and a carbon black pellet colorant mixture, providing said polymer component is not a post-consumer plastic or a post-industrial material; and applying a mechanical energy to said mixture through solid-state shear pulverization in the presence of cooling at least partially sufficient to maintain said polymer component in a solid state during said pulverization, said pulverization at least partially sufficient to disperse said carbon black colorant pellet within said polymer component, said carbon black pellet colorant prepared by providing a polymeric resin and a carbon black colorant component and applying a mechanical energy to said polymeric resin and said colorant component through solid-state shear pulverization in the presence of cooling at least partially sufficient to maintain said polymeric resin in a solid state during said pulverization, said pulverization at least partially sufficient to disperse said colorant component within said polymeric resin.

23. The method of claim 22 wherein said polymer component is selected from virgin polyesters, polyolefins, polyamides, epoxies, polymides, polyurethanes, polystyrenes, polycarbonates, polyacrylates, polyvinyls, polyethers, polyacrylonitriles, polyacetals, polysiloxanes, polyetherketones, elastomers and copolymers thereof, combinations of said polymers, combinations of said copolymers and combinations of said polymers and copolymers.

24. The method of claim 23 wherein said polymer component comprises a polyolefin.

25. The method of claim 22 wherein said carbon black colorant component comprises about 0.1 wt. % to about 60.0 wt. % of said mixture.

26. The method of claim 22 comprising melt-processing following solid-state shear pulverization.

27. The method of claim 22 wherein said polymer component and colorant pellet mixture comprises an additive selected from lubricants, antistats, impact modifiers, flame retardants, antimicrobials, anti-oxidants, light stabilizers, filler/reinforcing materials, heat stabilizers, release agents, rheological control agents and combinations thereof.

28. The method of claim 22 wherein said mixture is incorporated into an article of manufacture.

* * * * *